United States Patent
Gao et al.

(10) Patent No.: US 12,471,182 B2
(45) Date of Patent: Nov. 11, 2025

(54) METHOD AND APPARATUS FOR MANAGING WIRELESS MODE CAPABILITY, AND ELECTRONIC DEVICE AND STORAGE MEDIUM

(71) Applicant: ZTE Corporation, Shenzhen (CN)

(72) Inventors: Minggang Gao, Shenzhen (CN); Qingyu Ni, Shenzhen (CN); Wei Xiang, Shenzhen (CN); Xuemei Ding, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 387 days.

(21) Appl. No.: 18/023,053

(22) PCT Filed: Jun. 11, 2021

(86) PCT No.: PCT/CN2021/099862
§ 371 (c)(1),
(2) Date: Feb. 24, 2023

(87) PCT Pub. No.: WO2022/041943
PCT Pub. Date: Mar. 3, 2022

(65) Prior Publication Data
US 2023/0239962 A1    Jul. 27, 2023

(30) Foreign Application Priority Data
Aug. 28, 2020   (CN) .......................... 202010891872.7

(51) Int. Cl.
*G01R 31/08*   (2020.01)
*G06F 11/00*   (2006.01)
(Continued)

(52) U.S. Cl.
CPC ............. *H04W 76/34* (2018.02); *H04W 8/22* (2013.01); *H04W 52/0212* (2013.01); *H04W 76/10* (2018.02)

(58) Field of Classification Search
CPC ... H04W 76/34; H04W 8/22; H04W 52/0212; H04W 76/10; H04W 36/0055;
(Continued)

(56) References Cited

U.S. PATENT DOCUMENTS 6,424,833 B1 *  7/2002  Iizuka ................. H04W 36/302
                                                  370/332
6,968,190 B1 * 11/2005  Suumaki ........... H04W 36/0066
                                                  455/439
(Continued)

FOREIGN PATENT DOCUMENTS

CN   103313420 A    9/2013
CN   11055779 A    12/2019
(Continued)

OTHER PUBLICATIONS

European Search Report for corresponding application EP 21 85 9787: Report dated Feb. 9, 2024.
(Continued)

*Primary Examiner* — Stephen M D'Agosta
(74) *Attorney, Agent, or Firm* — CANTOR COLBURN LLP (57) ABSTRACT

Provided are a method and apparatus for managing a radio mode capability, and an electronic device and a computer-readable storage medium. The method for managing a radio mode capability may comprises: when a condition for triggering a process of disabling of a cell with a target radio mode is satisfied, releasing a local radio resource of the target radio mode, wherein the target radio mode is a radio mode may be implemented by using the non-standalone.

9 Claims, 6 Drawing Sheets

(51) Int. Cl.
*G08C 15/00* (2006.01)
*H04J 1/16* (2006.01)
*H04J 3/14* (2006.01)
*H04L 1/00* (2006.01)
*H04L 12/26* (2006.01)
*H04W 8/22* (2009.01)
*H04W 52/02* (2009.01)
*H04W 76/10* (2018.01)
*H04W 76/34* (2018.01)

(58) Field of Classification Search
CPC ......... H04W 36/00698; H04W 52/027; H04W 88/06; H04W 52/0216; H04W 52/0254; H04W 52/0258; H04W 76/16; H04W 24/10; Y02D 30/70
See application file for complete search history.

(56) References Cited

U.S. PATENT DOCUMENTS

| | | | | |
|---|---|---|---|---|
| 7,596,379 B2* | 9/2009 | Farnsworth | ........... | H04W 76/27 455/423 |
| 7,643,450 B2* | 1/2010 | Marinescu | ...... | H04W 36/00224 455/450 |
| 8,457,667 B2* | 6/2013 | Park | ...... | H04W 76/38 455/466 |
| 9,191,870 B2* | 11/2015 | Larmo | ...... | H04W 36/02 |
| 9,319,872 B1* | 4/2016 | Malreddy | ...... | H04W 24/02 |
| 9,374,739 B2* | 6/2016 | Shirota | ...... | H04W 68/12 |
| 9,554,406 B2* | 1/2017 | Lin | ...... | H04W 76/14 |
| 9,900,810 B2* | 2/2018 | Jung | ...... | H04W 76/23 |
| 10,028,204 B2* | 7/2018 | Blankenship | ...... | H04W 8/005 |
| 10,142,920 B2* | 11/2018 | Kim | ...... | H04W 48/12 |
| 10,327,280 B2* | 6/2019 | Wu | ...... | H04W 76/27 |
| 10,397,855 B2* | 8/2019 | Chun | ...... | H04W 48/14 |
| 10,667,321 B2* | 5/2020 | Bangolae | ...... | H04W 76/27 |
| 10,999,781 B2* | 5/2021 | Kim | ...... | H04W 48/08 |
| 11,051,233 B2* | 6/2021 | Futaki | ...... | H04W 88/02 |
| 11,109,286 B2* | 8/2021 | Futaki | ...... | H04W 76/27 |
| 11,166,187 B2* | 11/2021 | Feng | ...... | H04W 48/02 |
| 11,843,941 B2* | 12/2023 | Yoo | ...... | H04W 24/10 |
| 11,895,583 B2* | 2/2024 | Yuan | ...... | H04W 76/16 |
| 2002/0160815 A1* | 10/2002 | Patel | ...... | H04M 1/27485 455/564 |
| 2002/0193111 A1* | 12/2002 | Wallstedt | ...... | H04W 48/18 455/434 |
| 2003/0040311 A1* | 2/2003 | Choi | ...... | H04W 48/20 455/434 |
| 2006/0099943 A1* | 5/2006 | Koo | ...... | H04W 48/16 455/432.1 |
| 2008/0119186 A1* | 5/2008 | Song | ...... | H04W 36/10 455/436 |
| 2009/0052382 A1* | 2/2009 | Stephenson | ...... | H04W 16/14 455/67.11 |
| 2009/0052398 A1* | 2/2009 | Hofmann | ...... | H04W 36/0033 370/331 |
| 2010/0296421 A1* | 11/2010 | Watfa | ...... | H04W 76/18 370/360 |
| 2011/0162060 A1* | 6/2011 | Vijayakumar | ...... | H04L 12/413 726/13 |
| 2011/0205910 A1* | 8/2011 | Soomro | ...... | H04W 64/00 370/252 |
| 2011/0296125 A1* | 12/2011 | Shaikh | ...... | H04W 12/062 709/227 |
| 2012/0106506 A1* | 5/2012 | Taaghol | ...... | H04W 36/0085 370/331 |
| 2012/0202478 A1* | 8/2012 | Van Lieshout | ... | H04W 36/0064 455/419 |
| 2012/0225657 A1* | 9/2012 | Watanabe | ...... | H04W 36/0085 455/436 |
| 2013/0208699 A1 | 8/2013 | Hakkinen | | |
| 2013/0229939 A1* | 9/2013 | Teyeb | ...... | H04W 36/302 370/252 |
| 2013/0282855 A1* | 10/2013 | Lee | ...... | H04W 36/02 709/213 |
| 2014/0226740 A1* | 8/2014 | Harel | ...... | H04B 7/0413 375/267 |
| 2015/0181477 A1* | 6/2015 | Chaudhuri | ...... | H04W 36/00835 455/436 |
| 2015/0223136 A1* | 8/2015 | Gao | ...... | H04W 36/14 455/436 |
| 2015/0264614 A1* | 9/2015 | Stager | ...... | H04W 36/0085 370/332 |
| 2016/0112922 A1* | 4/2016 | Han | ...... | H04W 36/04 455/436 |
| 2016/0219475 A1 | 7/2016 | Kim | | |
| 2016/0249408 A1 | 8/2016 | Thiruvenkatachari | | |
| 2016/0323818 A1 | 11/2016 | Senarath et al. | | |
| 2017/0094570 A1* | 3/2017 | Kim | ...... | H04W 72/044 |
| 2017/0127473 A1 | 5/2017 | Virtej | | |
| 2017/0156084 A1* | 6/2017 | Lin | ...... | H04W 48/20 |
| 2017/0245135 A1* | 8/2017 | Park | ...... | H04W 8/06 |
| 2018/0091986 A1* | 3/2018 | Pedersen | ...... | H04W 36/26 |
| 2018/0279204 A1 | 9/2018 | Kim | | |
| 2018/0302914 A1* | 10/2018 | da Silva | ...... | H04W 76/27 |
| 2018/0367981 A1* | 12/2018 | Desai | ...... | H04W 36/0061 |
| 2019/0104443 A1* | 4/2019 | Zhang | ...... | H04W 36/0058 |
| 2019/0273582 A1* | 9/2019 | Yeo | ...... | H04L 1/1812 |
| 2019/0320316 A1 | 10/2019 | Mildh | | |
| 2020/0120569 A1 | 4/2020 | Baek et al. | | |
| 2020/0163131 A1 | 5/2020 | Youtz | | |
| 2020/0187291 A1 | 6/2020 | Sha | | |
| 2020/0322854 A1* | 10/2020 | Ryoo | ...... | H04W 36/0085 |
| 2020/0413301 A1* | 12/2020 | Shi | ...... | H04W 36/08 |

FOREIGN PATENT DOCUMENTS

CN 110557781 A 12/2019
CN 111342863 A 6/2020

OTHER PUBLICATIONS

Huawei, HiSilicon, "Discussion on rate matching in URLLC due to the ambiguity between PDCCH AL8 and AL 16", 3GPP TSG RAN WG1 Meeting #97, Reno, USA, May 13-17, 2019, R1-1906614.
International Search Report for corresponding application PCT/CN2021/099862 filed Jun. 11, 2021; Mail date Aug. 30, 2021.

* cited by examiner

METHOD AND APPARATUS FOR MANAGING WIRELESS MODE CAPABILITY, AND ELECTRONIC DEVICE AND STORAGE MEDIUM

CROSS-REFERENCE TO RELATED APPLICATION

The present disclosure is a National Stage Filing of the PCT International Application No. PCT/CN2021/099862 filed on Jun. 11, 2021, which claims priority to Chinese Patent Application No. 202010891872.7, filed to the China National Intellectual Property Administration on Aug. 28, 2020, the disclosure of which is hereby incorporated by reference in its entirety.

TECHNICAL FIELD

Embodiments of the present disclosure relate to the field of communications, and in particular, to a method and apparatus for managing radio mode capability, and electronic device and storage medium.

BACKGROUND

With the large-scale application of the 5G, the 5G Non-Stand Alone (NSA) and the Stand Alone (SA) are also used as products of two different architectures, and will coexist for a long time later. Especially, the 5G NSA will be a 5G technology mainly developed in several years in the future. Compared with the 5G SA, the 5G NSA uses two cells 4G and 5G at the same time, so that a terminal can enjoy 4G and 5G services at the same time, thereby reducing service interruption caused by reselecting and switching between the 4G and 5G SAs; furthermore, the 5G SA cannot support voice services temporarily at present, and calls must be made through an Evolved Packet System Fallback (EPS Fallback), which focuses on that voice services have obvious advantages over the 5G NSA in a long period of time.

However, the 5G NSA also has an inherent defect, for example, the process of adding and deleting a 5G cell by the 5G NSA is relatively frequent and complicated, which is a relatively large burden for a terminal and a base station. The frequent signaling interaction increases power consumption of the terminal and has a long time delay, thereby affecting the 5G experience of a user to a certain extent.

SUMMARY

Embodiments of the present disclosure may provide a method and an apparatus for managing radio mode capability, an electronic device, and a computer readable storage medium.

According to a first aspect, an embodiment of the present disclosure may provide a method for managing a radio mode capability, may be applied to a terminal in a non-standalone, including:

When a condition for triggering a process of disabling of a cell of a target radio mode is satisfied, releasing a local radio resource of the target radio mode; the target radio mode is a radio mode may be implemented by using the non-standalone.

According to a second aspect, an embodiment of the present disclosure may provide a method for managing a radio mode capability, may be applied to a terminal of non-standalone, including:

When a condition for triggering the enabling cell of a target radio mode is satisfied, establishing a local radio resource of the target radio mode; the target radio mode is a radio mode may ne implemented by using a non-standalone.

According to a third aspect, an embodiment of the present disclosure may provide an electronic device, including:

At least one processor;

A memory, wherein the memory stores at least one program; and when the at least one program is executed by at least one processor, the at least one processor may be enabled to implement any one of the described methods for managing radio mode capabilities.

According to a fourth aspect, an embodiment of the present disclosure may provide a computer readable storage medium. The computer readable storage medium stores a computer program. When the computer program may be executed by a processor, any one of the methods for managing radio mode capabilities is implemented.

DETAILED DESCRIPTION OF THE EMBODIMENTS

To make persons skilled in the art better understand the present disclosure, a method and apparatus for managing radio mode capability, and electronic device and storage medium provided in the present disclosure are described in detail below with reference to the accompanying drawings.

Example embodiments will be described more fully hereinafter with reference to the accompanying drawings, but may be embodied in various forms and should not be construed as limited to the embodiments set forth herein. Rather, these embodiments are provided so that this disclosure will be thorough and complete, and will fully convey the scope of the disclosure to those skilled in the art.

The embodiments of the present disclosure and the features in the embodiments may be combined with each other without conflict.

As used herein, the term "and/or" includes any and all combinations of at least one of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "made of" when used in this description, specify the presence of stated features, integers, steps, operations, elements, and/or components, but do not preclude the presence or addition of at least one other feature, integer, step, operation, element, component, and/or group thereof.

Unless otherwise defined, all terms (including technical and scientific terms) used herein have the same meaning as commonly understood by one of ordinary skill in the art. It will also be understood that terms, such as those defined in commonly used dictionaries, should be interpreted as having a meaning that is consistent with their meaning in the context of the relevant art and this disclosure, and will not be interpreted in an idealized or overly formal sense unless expressly so defined herein.

Figure 1:
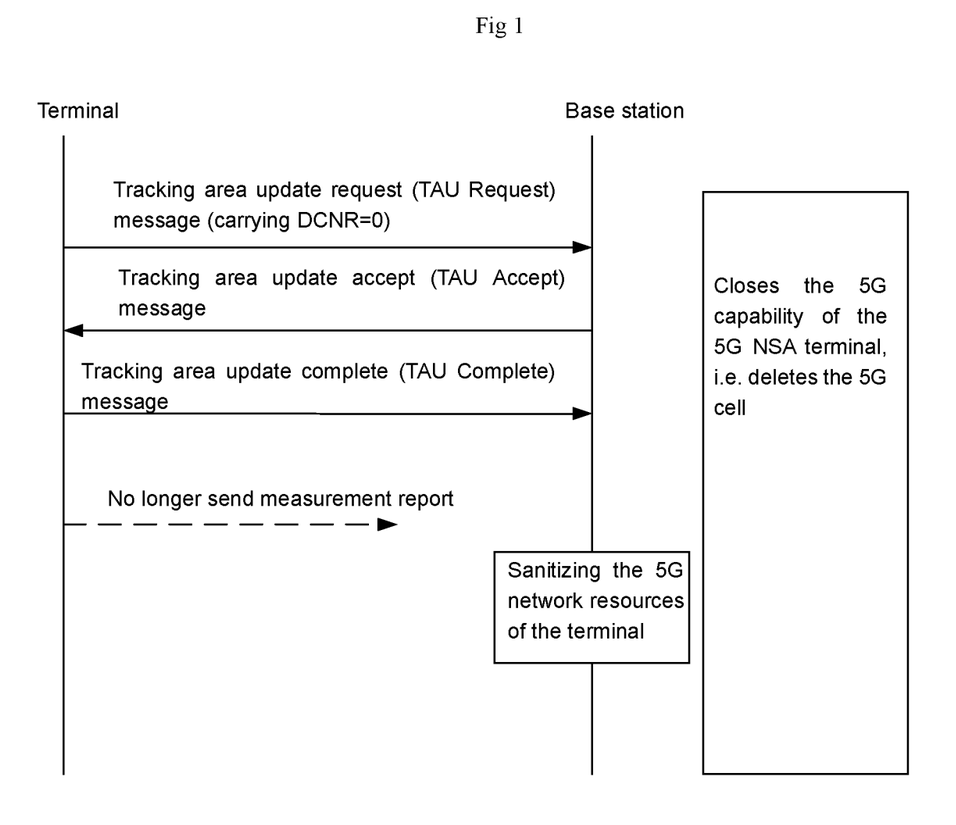
FIG. 1 is a flowchart of a method for a 5G NSA terminal to delete a 5G cell in the existing art.

The current method for deleting a 5G cell by a 5G NSA terminal is shown in FIG. 1, and generally comprises:

A terminal sends a tracking area update request (TAU Request) message to a base station, in which the TAU Request message carries a Dual Connectivity New Radio (DCNR), and sets the DCNR at zero; the base station returns a tracking area update accept (TAU Accept) message to the terminal; the terminal sends a tracking area update complete (TAU Complete) message to the base station; then the terminal does not measure the 5G signals any more, and does not send a signal measurement report for the 5G; the base station detects that the DCNR is zero, and does not receive a signal measurement report reported by the terminal, and clears a 5G network resource of the terminal.

Figure 2:
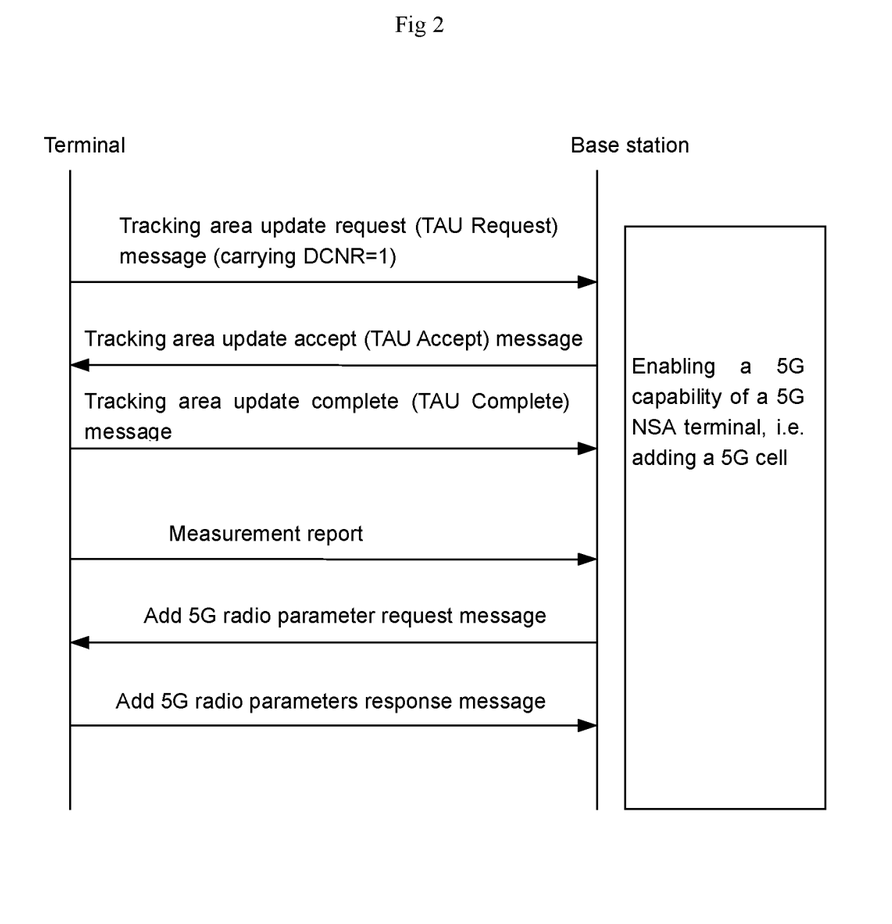
FIG. 2 is a flowchart of a method for a 5G NSA terminal to add a 5G cell in the existing art.

As shown in FIG. 2, a method for adding a 5G cell to a 5G NSA terminal generally comprises:

A terminal sends a TAU Request message to a base station, in which the TAU Request message carries a DCNR, and sets the DCNR at 1; the base station returns a TAU Accept message to the user equipment; the terminal sends a TAU Complete message to the base station; then the terminal measures a 5G signal, and sends a signal measurement report for the 5G to the base station; a base station detects that a DCNR is 1, receives a signal measurement report reported by a terminal, and sends a request message for adding a 5G radio parameter to the terminal; the terminal returns a radio parameter response message of adding 5G to the base station.

In the flow of the method shown in FIGS. 1 and 2, it can be found that every time a 5G NSA terminal adds or deletes a 5G cell, the terminal needs to send a TAU Request message, and carries a DCNR bit (which may be set to 0 or 1) in the message to prove that the 5G NSA terminal wants to add or delete the 5G cell. That is to say, the 5G NSA terminal needs to perform three times of 4G Non-Access Stratum (NAS) signalling interactions to implement zero setting and one setting of a DCNR bit, thereby triggering the base station to delete or add a 5G Radio resource Control (RRC) resource of the 5G NSA terminal, that is, triggering a process of adding and deleting a 5G cell through one bit.

In conclusion, the processes of adding and deleting a 5G cell in a 5G NSA are relatively frequent and complex, which is a relatively large burden for a terminal and a base station. The frequent signaling interaction increases power consumption of the terminal, and has a long time delay, thereby affecting the 5G experience of a user to a certain extent.

It should be noted that although the method for managing the radio mode capability according to the embodiment of the present disclosure is proposed based on the problem existing in the process of adding or deleting the 5G cell of the 5G NSA terminal. However, the method for managing the radio mode capability according to the embodiment of the present disclosure is also applicable to addition or deletion of a high-mode cell of an NSA terminal of another radio mode. The specific radio mode is not intended to limit the scope of protection of the embodiments of the present disclosure.

It should be noted that although the method for managing the radio mode capability according to the embodiment of the present disclosure is proposed based on the problem existing in the process of adding or deleting the 5G cell of the 5G NSA terminal. However, it can be understood that after a 5G cell is added or deleted, the corresponding 5G capability is enabled or disabled. Therefore, the addition or deletion of the 5G cell is actually the enabling or disabling of the 5G capability, i.e. the management of the 5G capability.

Figure 3:
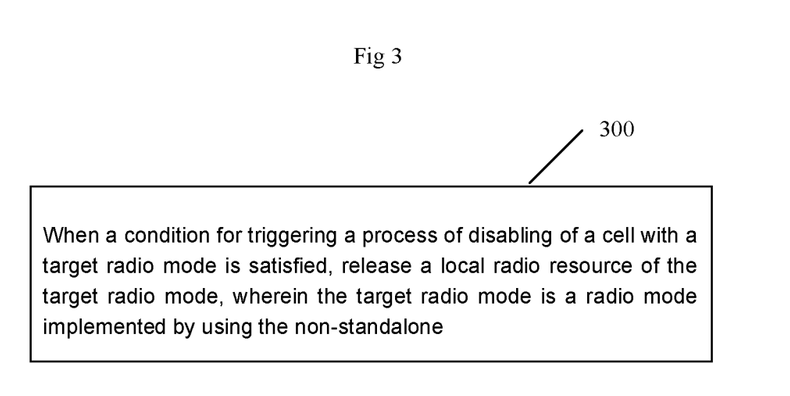
FIG. 3 is a flowchart of a method for managing a radio mode capability according to an embodiment of the present disclosure.

FIG. 3 is a flowchart of a method for managing a radio mode capability according to an embodiment of the present disclosure.

In a first aspect, referring to FIG. 3, an embodiment of the present disclosure provides a method for managing capabilities of a radio mode, which is applied to a terminal in a non-independent network group. It should be noted that the terminal in the non-independent network group may be a terminal in a non-independent network group of any radio mode, such as a 5G NSA terminal or a 6G NSA terminal. Any terminal implemented by using a non-standalone technology is within the scope of protection of the embodiments of the present disclosure.

The method comprises:

Step 300, when a condition for triggering a process of disabling of the cell of target radio mode is satisfied, releasing a local radio resource of the target radio mode; the target radio mode is a radio mode implemented by using a non-standalone.

In some example embodiments, the target radio mode may be 5G, or 6G, or another radio mode. Any radio mode cell implemented by adopting non-standalone belongs to the scope of protection of the embodiment of the present disclosure.

In some exemplary embodiments, the radio resources comprise all radio resources required for performing radio communication, for example, the radio resources comprise a Radio resource Control (RRC) resource, a Media Access Control (MAC) resource, a Radio Link Control (RLC) resource and a physical resource, etc.

In some exemplary embodiments, releasing the local radio resources of the target radio mode includes:

Storing all the configuration parameters of the RRC layer of the target radio mode, releasing all the configuration parameters of the RRC layer of the target radio mode, and disconnecting the RRC link;

Storing all the configuration parameters of the MAC layer, the RLC layer and the physical layer of the target radio mode, releasing all the resources of the MAC layer, the RLC layer and the physical layer of the target radio mode, and closing the transmission and reception of a radio signal.

In some exemplary embodiments, all the configuration parameters of the RRC layer, the MAC layer, the RLC layer and the physical layer of the target radio mode may be stored in a memory, a magnetic disk or any other storage medium. The specific storage location is not intended to limit the scope of protection of the embodiments of the present disclosure.

In some exemplary embodiments, the condition for triggering a process of disabling of the cell of target radio mode may be set randomly according to an actual situation. For example, after the terminal is in a screen-off state or a screen-off power storing mode, data interaction is generally not performed, or the amount of data to be exchanged is very small, and in this case, generally, the communication requirements of the terminal can be satisfied by the communication of other radio modes. Therefore, the terminal in a screen-off state or a screen-off power storing mode may be set as a condition for triggering the deactivation of the cell of target radio mode.

For another example, when the amount of data, which is currently exchanged by the terminal, is small, it is considered that the communication of other systems can meet the communication requirement required by the terminal, and the condition that the amount of data currently exchanged by the terminal is less than or equal to the first preset threshold can be set as a condition for triggering to disable the cell of target radio mode.

For another example, when the temperature of the terminal is too high, in order to reduce the temperature of the terminal, the condition that the temperature of the terminal is greater than or equal to a second preset threshold may be set to trigger disabling of the target radio cell.

For another example, when the terminal is in a low-temperature environment, in order to reduce power consumption of the terminal, a condition that the temperature of the terminal is less than or equal to a third preset threshold may be set to trigger disabling of the target radio cell.

For another example, when the quantity of remaining electricity of the terminal is small, in order to save electricity, the quantity of remaining electricity of the terminal may be less than or equal to a fourth preset threshold, which is set as a condition for triggering a process of disabling of the target radio cell.

It should be noted that only one or two or more conditions may be set. That is to say, the condition for triggering a process of disabling of the cell of target radio mode may be set as at least one of the following conditions:

Detecting that the terminal is currently in a screen-off state;

Detecting that a terminal is currently in a screen-off power saving mode;

Detecting that the amount of data, which is currently interacted by the terminal, is less than or equal to a first preset threshold;

Detecting that the temperature of the terminal is greater than or equal to a second preset threshold;

Detecting that the temperature of the terminal is less than or equal to a third preset threshold;

Detecting that the remaining electricity quantity of the terminal is less than or equal to a fourth pre-set threshold value.

It should be noted that, the embodiment of the present disclosure does not limit the specific conditions that need to be met to trigger disabling of the cell of target radio mode. The embodiment of the present disclosure emphasizes that in the case that the condition of triggering to disable the cell of target radio mode is satisfied, the deletion of the cell of target radio mode can be realized only by releasing the local radio resource of the target radio mode. There is no need to perform complex signaling interaction, thereby improving the user experience.

In some exemplary embodiments, after releasing the local radio resources of the target radio mode, the terminal does not respond to all data packets or signaling received through the target radio mode, and disables all functions related to the target radio mode, such as measuring all target mode cells and reporting signal measurement reports of all cell of target radio modes.

In some exemplary embodiments, after releasing the local radio resource of the target radio mode, the method further includes:

Stopping measurement on all cell of target radio modes, and stopping reporting signal measurement reports of all cell of target radio modes.

For the base station, after detecting that the radio resources of the target radio mode of the terminal are released (for example, not receiving a signal measurement report of a cell of target radio mode reported by the terminal, or not receiving a response to a data packet or signalling sent by the terminal from the base station, etc.), the base station clears the network resources of the target radio mode of the terminal.

In some exemplary embodiments, when the condition for triggering the cell of target radio mode is satisfied, the method further includes: establishing local radio resources of the target radio mode.

In some exemplary embodiments, the condition for triggering and enabling the cell of target radio mode may be set randomly according to an actual situation. For example, after a terminal is in a screen-on state, a relatively large amount of data is generally exchanged, and in this case, generally communication of other radio modes cannot meet a communication requirement required by the terminal. Therefore, the terminal being in the screen-on state may be set as a condition for triggering the enabling of the cell of target radio mode.

For another example, when the amount of data currently exchanged by the terminal is large, if it is considered that the communication of the another mode cannot meet the communication requirement required by the terminal, the amount of data, which is currently exchanged by the terminal, may be greater than the first preset threshold, which is set as a condition for triggering the enabling of the cell of target radio mode.

For another example, when the temperature of the terminal returns to normal from a high temperature, the terminal does not need to be cooled, and the temperature of the terminal less than the second preset threshold may be set as a condition for triggering the enabling of the target radio cell.

For another example, when the terminal leaves the low temperature environment, the power consumption of the terminal is considered to be normal, and the power consumption of the terminal does not need to be controlled any more, and the condition that the temperature of the terminal is greater than a third preset threshold may be set as a condition for triggering the enabling of the target radio cell.

For another example, when the remaining quantity of electricity of the terminal is large or the terminal is in a charging state, it is considered that no more electricity needs to be saved, and the condition that the remaining quantity of electricity of the terminal is greater than the fourth preset threshold may be set as a condition for triggering the enabling of the target radio cell.

It should be noted that only one or two or more conditions may be set. That is to say, the condition for triggering and enabling the cell of target radio mode can be set as at least one of the following conditions:

Detecting that the terminal is currently in a screen-on state;

Detecting that a data volume of current interaction of the terminal is greater than a first preset threshold;

Detecting that a temperature of the terminal is less than a second preset threshold;

Detecting that the temperature of the terminal is greater than a third preset threshold;

Detecting that the remaining electric quantity of the terminal is greater than a fourth pre-set threshold value;

Detecting that the terminal is in a charging state.

It should be noted that, the embodiment of the present disclosure does not limit to what conditions need to be met to trigger the cell of target radio mode to be triggered. It is emphasized in the embodiments of the present disclosure that in the case that the condition for triggering the enabling of the cell of target radio mode is satisfied, adding a cell of target radio mode can be realized only by establishing a local radio resource of a target radio mode. There is no need to perform complex signaling interaction, thereby improving the user experience.

In some exemplary embodiments, after local radio resources of a target radio mode are established, a terminal responds to all data packets or signalling received via the target radio mode, and triggers all functions related to the target radio mode, such as measuring all target mode cells and reporting signal measurement reports of all cell of target radio modes.

In some exemplary embodiments, after establishing the local radio resource of the target radio mode, the method further includes:

Enabling measurement on all cell of target radio modes, and enabling the reporting of signal measurement reports of all the cell of target radio modes.

For the base station, after detecting that the radio resources of the target radio mode of the terminal are established (for example, receiving a signal measurement report of a cell of target radio mode reported by the terminal, or receiving a response of the terminal to a data packet or signalling sent by the base station, etc.), the base station clears the network resources of the target radio mode of the terminal.

According to the method for managing a radio mode capability provided in the embodiments of the present disclosure, when a condition for triggering a process of disabling a cell of target radio mode is satisfied, only a local radio resource of the target radio mode needs to be released, without performing frequent signaling interaction, thereby simplifying a deletion process of the cell of target radio mode, reducing power consumption, reducing a time delay, and improving user experience.

In some exemplary embodiments, when a condition for triggering the cell of target radio mode is satisfied, only local radio resources of the target radio mode need to be established, and frequent signaling interaction is not required, thereby simplifying a process of adding the cell of target radio mode, reducing power consumption, reducing time delay, and improving user experience.

Figure 4:
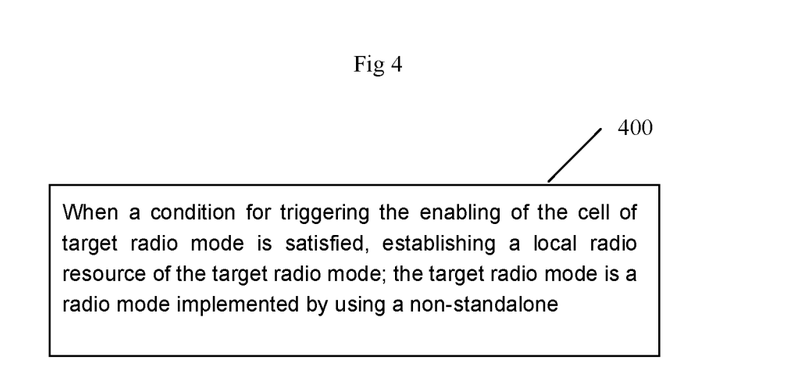
FIG. 4 is a flowchart of a method for managing a radio mode capability according to another embodiment of the present disclosure.

FIG. 4 is a flowchart of a method for managing a radio mode capability according to another embodiment of the present disclosure.

In a second aspect, referring to FIG. 4, another embodiment of the present disclosure provides a method for managing capabilities of a radio mode, which is applied to a terminal in a non-independent network group. It should be noted that the terminal in the non-independent network group may be a terminal in a non-independent network group of any radio mode, such as a 5G NSA terminal or a 6G NSA terminal, etc. Any terminal implemented by using a non-standalone technology is within the scope of protection of the embodiments of the present disclosure.

The method comprises:

Step 400, when a condition for triggering the enabling of the cell of target radio mode is satisfied, establishing a local radio resource of the target radio mode; the target radio mode is a radio mode implemented by using a non-standalone.

In some example embodiments, the target radio mode may be 5G, or 6G, or another radio mode. Any radio mode cell implemented by adopting non-standalone belongs to the scope of protection of the embodiment of the present disclosure.

In some example embodiments, the radio resources include all radio resources required for performing radio communication, for example, the radio resources include RRC resources, MAC resources, RLC resources and physical resources, etc.

In some exemplary embodiments, establishing the local radio resource of the target radio mode includes:

restoring all the previously released configuration parameters of the RRC layer of the target radio mode, and establishing an RRC link;

restoring all the resources of the MAC layer, the RLC layer and the physical layer of the target radio mode released before, and establishing the transmission and reception of a radio signal.

In some exemplary embodiments, the condition for triggering and enabling the cell of the target radio mode may be set randomly according to an actual situation. For example, after a terminal is in a screen-on state, a relatively large amount of data is generally exchanged, and in this case, generally communication of other radio modes cannot meet a communication requirement required by the terminal. Therefore, the terminal being in the screen-on state may be set as a condition for triggering the enabling of the cell of target radio mode.

For another example, when the amount of data currently exchanged by the terminal is large, if it is considered that the communication of the another mode cannot meet the communication requirement required by the terminal, the amount of data currently exchanged by the terminal may be greater than the first preset threshold, which is set as a condition for triggering the enabling of the cell of target radio mode.

For another example, when the temperature of the terminal returns to normal from a high temperature, the terminal does not need to be cooled, and the temperature of the terminal less than the second preset threshold may be set as a condition for triggering the enabling of the target radio cell.

For another example, when the terminal leaves the low temperature environment, the power consumption of the terminal is considered to be normal, and the power consumption of the terminal does not need to be controlled any more, and the condition that the temperature of the terminal is greater than a third preset threshold may be set as a condition for triggering the enabling of the target radio cell.

For another example, when the remaining quantity of electricity of the terminal is large or the terminal is in a charging state, it is considered that no more electricity needs to be saved, and the condition that the remaining quantity of electricity of the terminal is greater than the fourth preset threshold may be set as a condition for triggering the enabling of the target radio cell.

It should be noted that only one or two or more conditions may be set. That is to say, the condition for triggering and enabling the cell of target radio mode may be set to at least one of the following conditions:

Detecting that the terminal is currently in a screen-on state;

Detecting that a data volume of current interaction of the terminal is greater than a first preset threshold;

Detecting that a temperature of the terminal is less than a second preset threshold;

Detecting that the temperature of the terminal is greater than a third preset threshold;

Detecting that the remaining electric quantity of the terminal is greater than a fourth pre-set threshold value;

Detecting that the terminal is in a charging state.

It should be noted that, the embodiment of the present disclosure does not limit to what conditions need to be met to trigger the cell of target radio mode to be triggered. It is emphasized in the embodiments of the present disclosure that in the case that the condition for triggering the enabling of the cell of target radio mode is satisfied, adding a cell of target radio mode can be realized only by establishing a local radio resource of a target radio mode. There is no need to perform complex signaling interaction, thereby improving the user experience.

In some exemplary embodiments, after local radio resources of a target radio mode are established, a terminal responds to all data packets or signalling received via the target radio mode, and triggers all functions related to the target radio mode, such as measuring all target mode cells and reporting signal measurement reports of all cell of target radio modes.

In some exemplary embodiments, after establishing the local radio resource of the target radio mode, the method further includes:

Enabling measurement on all cell of target radio modes, and enabling the reporting of signal measurement reports of all cell of target radio modes.

For the base station, after detecting that the radio resources of the target radio mode of the terminal are established (for example, receiving a signal measurement report of a cell of target radio mode reported by the terminal, or receiving a response of the terminal to a data packet or signalling sent by the base station, etc.), the base station clears the network resources of the target radio mode of the terminal.

According to the method for managing a radio mode capability provided in the embodiments of the present disclosure, when a condition for triggering a cell of target radio mode is satisfied, only local radio resources of the target radio mode need to be established without performing frequent signaling interaction, thereby simplifying an addition process of the cell of target radio mode, reducing power consumption, reducing a time delay, and improving user experience.

The specific implementation process of the method for managing the radio mode capability according to the embodiment of the present disclosure will be described below with two examples. The examples listed are only for the convenience of description, and are not intended to limit the scope of protection of the embodiment of the present disclosure.

Example 1

Figure 5:
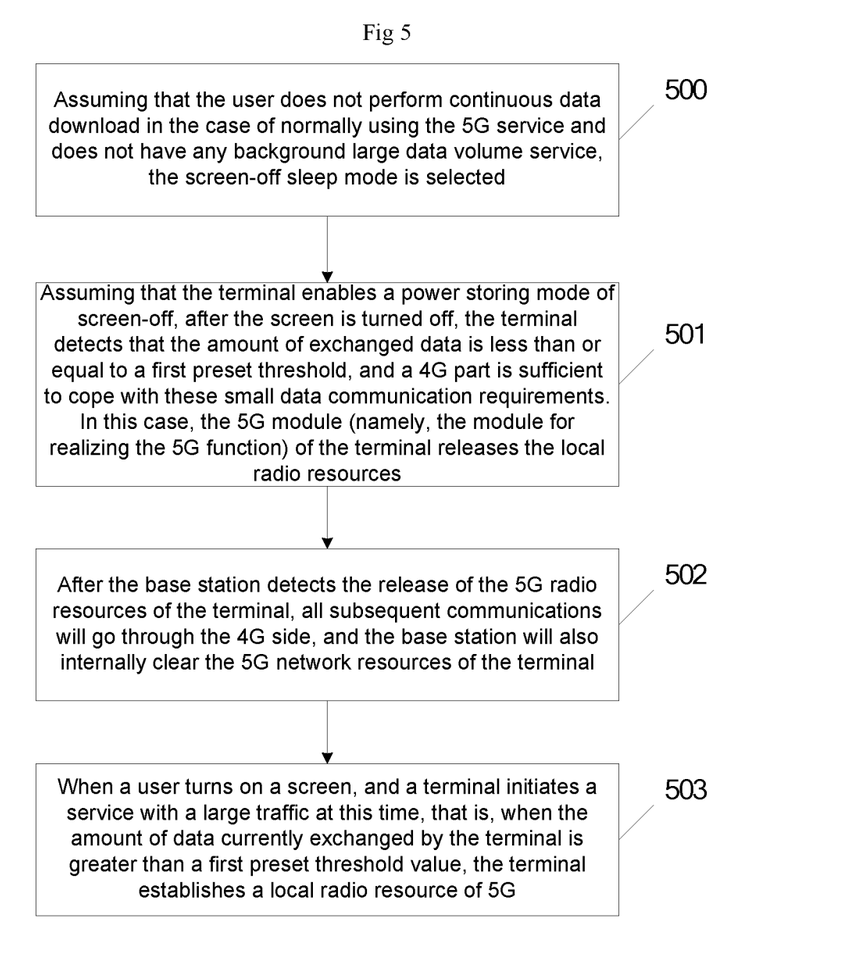
FIG. 5 is a flowchart of a method for managing a radio mode capability according to Example 1 of the embodiment of the present disclosure.

This example describes the disabling and enabling of a radio mode capability based on a screen-off operation and a screen-on operation of a user. As shown in FIG. 5, the method comprises:

Step 500, it is assumed that the user does not perform continuous data download in the case of using the 5G service normally, and selects to go off-screen and sleep in the case of no large-data-volume service in the background.

Step 501, it is assumed that a terminal enables a power storing mode in which a screen is turned off. After the screen is turned off, the terminal detects that the amount of exchanged data is less than or equal to a first preset threshold, and a 4G part is sufficient to cope with these small data communication requirements. In this case, the 5G module (namely, the module for realizing the 5G function) of the terminal releases the local radio resources.

In this step, after the local radio resources of the 5G are released, the terminal stops reporting measurement on all the 5G cells and measurement results (namely, signal measurement reports of the 5G cell), so as to prevent the base station from re-adding the 5G cell after the terminal reports the signal measurement report of the 5G cell when the stronger 5G cell exists in the movement process of the user.

Step 502, after the base station detects the release of the 5G radio resources of the terminal, all subsequent communications will go through the 4G side, and the base station will also internally clear the 5G network resources of the terminal.

Step 503, the user performs a screen turn-on operation, and when the terminal initiates a large-traffic service at this time, that is, when the amount of data currently exchanged by the terminal is greater than the first preset threshold, the terminal establishes a local radio resource of 5G.

In this step, after a local radio resource of the 5G is established, the terminal enables measurement on the 5G and reporting of a measurement result (namely, a signal measurement report of the 5G cell); and after receiving the signal measurement report of the 5G cell, the base station initiates an operation of adding the 5G cell, and a user normally performs a data service of the 5G.

Example 2

Figure 6:
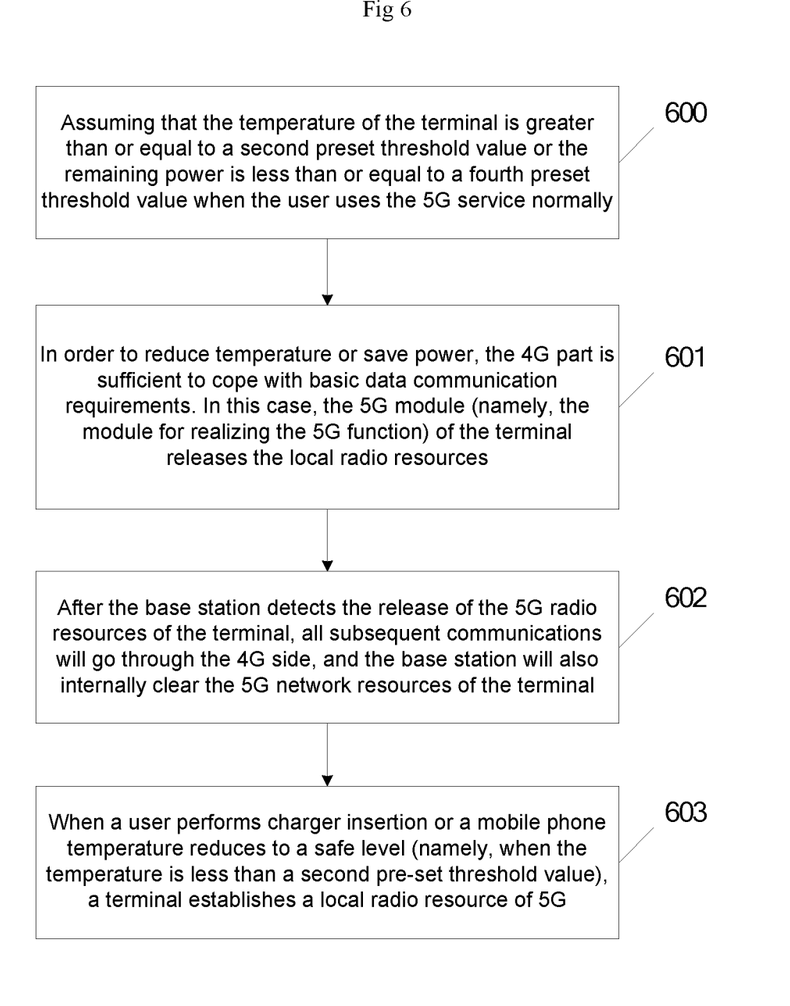
FIG. 6 is a flowchart of a method for managing a radio mode capability according to Example 2 of the embodiment of the present disclosure.

The present example describes the disabling and enabling of the radio mode capability under the condition that the terminal is overheated or has a low electric quantity, and as shown in FIG. 6, the method comprises:

Step 600, it is assumed that the temperature of the terminal is greater than or equal to a second preset threshold value or the remaining power is less than or equal to a fourth preset threshold value when the user uses the 5G service normally.

Step 601, to reduce temperature or save power, the 4G part is enough to meet basic data communication requirements. In this case, the 5G module (namely, the module for realizing the 5G function) of the terminal releases the local radio resources.

In this step, after the local radio resources of the 5G are released, the terminal stops reporting measurement and measurement results (namely, signal measurement reports of the 5G cell) of all the 5G cells, so as to prevent the base station from re-adding the 5G cell after the terminal reports the signal measurement report of the 5G cell when the stronger 5G cell exists in the movement process of the user.

Step 602, after the base station detects the release of the 5G radio resources of the terminal, all subsequent communications will go through the 4G side, and the base station will also internally clear the 5G network resources of the terminal.

Step 603, the user performs charger insertion or the temperature of the mobile phone drops to a safe level (namely, when the temperature is less than a second preset threshold), and the terminal establishes a local radio resource of 5G.

In this step, after a local radio resource of the 5G is established, the terminal enables measurement on the 5G and reporting of a measurement result (namely, a signal measurement report of the 5G cell); and after receiving the signal measurement report of the 5G cell, the base station initiates an operation of adding the 5G cell, and a user normally performs a data service of the 5G.

According to a third aspect, an embodiment of the present disclosure provides an electronic device, including:

At least one processor;

A memory, wherein the memory stores at least one program; and when the at least one program is executed by at least one processor, the at least one processor is enabled to implement any one of the described methods for managing radio mode capabilities.

The processor is a device having a data processing capability, and includes, but is not limited to, a central processing unit (CPU), and the like; a memory is a device with data storage capability, and includes, but is not limited to, a random access memory (RAM, more specifically, an SDRAM, a DDR, and the like), a read-only memory (ROM), an electrically erasable programmable read-only memory (EEPROM), and a flash memory (FLASH).

In some embodiments, the processor, memory, and other components of the computing device are connected to each other via a bus.

According to a fourth aspect, an embodiment of the present disclosure provides a computer readable storage medium. The computer readable storage medium stores a computer program. When the computer program is executed by a processor, any one of the methods for managing radio mode capabilities is implemented.

Figure 7:
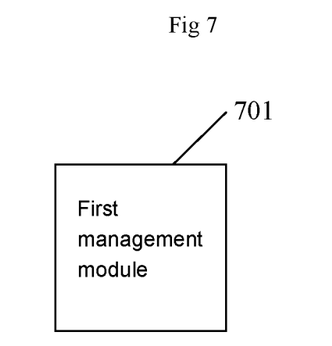
FIG. 7 is a constitutional block diagram of an apparatus for managing a radio mode capability according to another embodiment of the present disclosure.

FIG. 7 is a composition block diagram of an apparatus for managing radio mode capabilities according to another embodiment of the present disclosure.

In a fifth aspect, referring to FIG. 7, another embodiment of the present disclosure provides a device for managing radio mode capabilities. The device for managing radio mode capabilities may be disposed in a terminal of non-standalone. The device for managing radio mode capabilities includes:

A first management module 701, configured to release local radio resources of a target radio mode when a condition for triggering a process of disabling of a cell of target radio mode is satisfied; the target radio mode is a radio mode implemented by using a non-standalone.

In some exemplary embodiments, the first managing module 701 is further configured to:

Stopping measurement on all cell of target radio modes, and stopping reporting signal measurement reports of all cell of target radio modes.

In some exemplary embodiments, the condition for triggering a process of disabling of the cell of target radio mode comprises at least one of the following:

Detecting that the terminal is currently in a screen-off state;

Detecting that a terminal is currently in a screen-off power saving mode;

Detecting that the amount of data currently interacted by the terminal is less than or equal to a first preset threshold;

Detecting that the temperature of the terminal is greater than or equal to a second preset threshold;

Detecting that the temperature of the terminal is less than or equal to a third preset threshold;

Detecting that the remaining electricity quantity of the terminal is less than or equal to a fourth pre-set threshold value.

In some exemplary embodiments, the first managing module 701 is further configured to:

When a condition for triggering the enabling of the cell of target radio mode is satisfied, establishing a local radio resource of the target radio mode.

In some example embodiments, the first management module 701 also:

Enabling measurement on all cell of target radio modes, and enabling the reporting of signal measurement reports of all cell of target radio modes.

In some exemplary embodiments, the condition for triggering the cell of target radio mode to be triggered is satisfied by at least one of the following:

Detecting that the terminal is currently in a screen-on state;

Detecting that a data volume of current interaction of the terminal is greater than a first preset threshold;

Detecting that a temperature of the terminal is less than a second preset threshold;

Detecting that the temperature of the terminal is greater than a third preset threshold;

Detecting that the remaining electric quantity of the terminal is greater than a fourth pre-set threshold value;

Detecting that the terminal is in a charging state.

The specific implementation process of the device for managing the radio mode capability is the same as the specific implementation process of the method for managing the radio mode capability in the foregoing embodiment, and is not further described herein.

Figure 8:
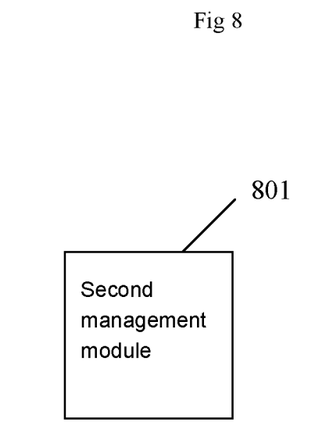
FIG. 8 is another composition block diagram of a device for managing a radio mode capability according to another embodiment of the present disclosure.

FIG. 8 is another composition block diagram of a device for managing a radio mode capability according to another embodiment of the present disclosure.

In a sixth aspect, referring to FIG. 8, another embodiment of the present disclosure provides a device for managing radio mode capabilities. The device for managing radio mode capabilities may be disposed in a terminal of non-standalone. The device for managing radio mode capabilities includes:

A second management module 801, configured to, when a condition for triggering the enabling of a cell of target radio mode is satisfied, establish a local radio resource of the target radio mode; the target radio mode is a radio mode implemented by using a non-standalone.

In some exemplary embodiments, the second management module 801 is further configured to:

Enabling measurement on all cell of target radio modes, and enabling the reporting of signal measurement reports of all cell of target radio modes.

In some exemplary embodiments, the condition for triggering the cell of target radio mode to be triggered is satisfied by at least one of the following:

Detecting that the terminal is currently in a screen-on state;

Detecting that a data volume of current interaction of the terminal is greater than a first preset threshold;

Detecting that a temperature of the terminal is less than a second preset threshold;

Detecting that the temperature of the terminal is greater than a third preset threshold;

Detecting that the remaining electric quantity of the terminal is greater than a fourth pre-set threshold value;

Detecting that the terminal is in a charging state.

The specific implementation process of the device for managing the radio mode capability is the same as the specific implementation process of the method for managing the radio mode capability in the foregoing embodiment, and is not further described herein.

Those of ordinary skill in the art can appreciate that the functional blocks/units in all or some of the steps, systems, and apparatuses of the methods disclosed above can be implemented as software, firmware, hardware, and any suitable combination thereof. In a hardware implementation, the division between functional modules/units referred to in the above description does not necessarily correspond to the division of physical components; for example, one physical component may have multiple functions, or one function or step may be cooperatively performed by several physical components. Some or all of the physical components may be implemented as software executed by a processor, such as a central processor, digital signal processor, or microprocessor, or as hardware, or as an integrated circuit, such as an application specific integrated circuit. Such software may be distributed on computer-readable media, which may include computer storage media (or non-transitory media) and communication media (or transitory media). As is well known to those of ordinary skill in the art, the term computer storage media includes both volatile and nonvolatile, removable and non-removable media, which are implemented in any method or technology arranged to store information such as computer readable instructions, data structures, program modules, or other data. Computer storage media includes, but is not limited to, RAM, ROM, EEPROM, flash memory or other memory technology, CD-ROM, digital versatile discs (DVD) or other optical disk storage, magnetic cassettes, magnetic tape, magnetic disk storage or other magnetic storage devices, or any other medium which can be used to store the desired information and which can be accessed by a computer. In addition, communication media typically embodies computer readable instructions, data structures, program modules, or other data in a modulated data signal such as a carrier wave or other transport mechanism and may include any information delivery media as is known to those of ordinary skill in the art.

Example embodiments have been disclosed herein, and while specific terms are employed, they are used and should be interpreted in a generic and descriptive sense only and not for purposes of limitation. In some instances, as would be apparent to one of skill in the art, features, characteristics, and/or elements described in connection with a particular embodiment may be used singly or in combination with features, characteristics, and/or elements described in connection with other embodiments unless specifically indicated otherwise. It will thus be understood by those skilled in the art that various changes in form and details may be made therein without departing from the scope of the disclosure as set forth in the appended claims.

What is claimed is:

1. A method for managing a radio mode capability, applied to a terminal of non-standalone, comprising:

when a condition for triggering a process of disabling of a cell of a target radio mode is satisfied, releasing a local radio resource of the target radio mode; wherein the target radio mode is a radio mode implemented by using the non-standalone;

wherein the releasing local radio resources of the target radio mode comprises:

storing all configuration parameters of radio resource control layer of the target radio mode, releasing all the configuration parameters of the radio resource control layer of the target radio mode, and disconnecting a radio resource control link;

storing all the configuration parameters of media access control (MAC) layer, radio link control (RLC) layer and physical (PHY) layer of the target radio mode, releasing all the resources of the media access control layer, the radio link control layer and the physical layer of the target radio mode, and closing the transmission and reception of a radio signal;

after releasing the local radio resource of the target radio mode, the method further comprises:

stopping measurement on all cells of the target radio mode, and stopping reporting signal measurement reports of all cells of the target radio mode;

when a condition for triggering the enabling of the cell of target radio mode is satisfied, the method further comprises:

establishing local radio resources of the target radio mode;

enabling measurement on all cells of the target radio mode, and enabling reporting of signal measurement reports of all cells of the target radio mode;

wherein the condition for triggering the enabling of the cell of target radio mode comprises at least one of the following:

detecting that the terminal is currently in a screen-on state;

detecting that the amount of data, which is currently interacted with by the terminal, is greater than a first preset threshold;

detecting that a temperature of the terminal is less than a second preset threshold;

detecting that the temperature of the terminal is greater than a third preset threshold;

detecting that the power level of the terminal is greater than a fourth preset threshold value;

detecting that the terminal is in a charging state.

2. The method according to claim 1, the condition for triggering the process of disabling of the cell of the target radio mode comprises at least one of the following:

detecting that the terminal is currently in a screen-off state;

detecting that the terminal is currently in a screen-off power saving mode;

detecting that the amount of data, which is currently interacted by the terminal, is less than or equal to a first preset threshold;

detecting that temperature of the terminal is greater than or equal to a second preset threshold;

detecting that the temperature of the terminal is less than or equal to a third preset threshold;

detecting that remaining power of the terminal is less than or equal to a fourth preset threshold.

3. The method according to claim 1, wherein the condition for triggering the enabling of the cell of target radio mode comprises at least one of the following:

detecting that the terminal is currently in a screen-on state;

detecting that the amount of data, which is currently interacted with by the terminal, is greater than a first preset threshold;

detecting that a temperature of the terminal is less than a second preset threshold;
detecting that the temperature of the terminal is greater than a third preset threshold;
detecting that the power level of the terminal is greater than a fourth preset threshold value;
detecting that the terminal is in a charging state.

4. The method according to claim 1, wherein the establishing local radio resources of the target radio mode comprises:
restoring all previously released configuration parameters of radio resource control layer of the target radio mode, and establishing a radio resource control link;
restoring all previously released resources of MAC layer, RLC layer and PHY layer of the target radio mode, and starting the transmission and reception of radio signals.

5. An electronic apparatus, comprising:
at least one processor;
a memory, wherein the memory stores at least one program, and when the at least one program is executed by the at least one processor, the at least one processor is enabled to implement the method for managing a radio mode capability according to claim 1.

6. A non-transitory computer readable storage medium, wherein the computer readable storage medium stores a computer program, and when the computer program is executed by a processor, the method for managing of a radio mode capability according to claim 1 is implemented.

7. The method according to claim 1, wherein the condition for triggering the process of disabling of the cell of the target radio mode comprises at least one of the following:
detecting that the terminal is currently in a screen-off state;
detecting that the terminal is currently in a screen-off power saving mode;
detecting that the amount of data, which is currently interacted by the terminal, is less than or equal to a first preset threshold;
detecting that temperature of the terminal is greater than or equal to a second preset threshold;
detecting that the temperature of the terminal is less than or equal to a third preset threshold;
detecting that remaining power of the terminal is less than or equal to a fourth preset threshold.

8. The method according to claim 1, wherein the releasing local radio resources of the target radio mode comprises:
storing all configuration parameters of radio resource control layer of the target radio mode, releasing all the configuration parameters of the radio resource control layer of the target radio mode, and disconnecting a radio resource control link;
storing all the configuration parameters of media access control layer, radio link control layer and physical layer of the target radio mode, releasing all the resources of the media access control layer, the radio link control layer and the physical layer of the target radio mode, and closing the transmission and reception of a radio signal.

9. The method according to claim 1, wherein the establishing local radio resources of the target radio mode comprises:
restoring all previously released configuration parameters of radio resource control layer of the target radio mode, and establishing a radio resource control link;
restoring all previously released resources of MAC layer, RLC layer and PHY layer of the target radio mode, and starting the transmission and reception of radio signals.

\* \* \* \* \*